(12) United States Patent
Schütz et al.

(10) Patent No.: US 12,355,198 B2
(45) Date of Patent: Jul. 8, 2025

(54) COUPLING SYSTEM FOR ESTABLISHING AN ELECTRIC CONNECTION

(71) Applicant: VOITH PATENT GMBH, Heidenheim (DE)

(72) Inventors: Rainer Schütz, Neresheim (DE); Marco Toneatto, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 489 days.

(21) Appl. No.: 17/796,360

(22) PCT Filed: Jan. 28, 2021

(86) PCT No.: PCT/EP2021/051973
§ 371 (c)(1),
(2) Date: Jul. 29, 2022

(87) PCT Pub. No.: WO2021/156134
PCT Pub. Date: Aug. 12, 2021

(65) Prior Publication Data
US 2023/0120198 A1    Apr. 20, 2023

(30) Foreign Application Priority Data
Feb. 5, 2020 (DE) .................. 10 2020 102 839.3

(51) Int. Cl.
*H01R 4/34* (2006.01)
*B60R 16/03* (2006.01)
*H02K 5/22* (2006.01)

(52) U.S. Cl.
CPC .............. *H01R 4/34* (2013.01); *B60R 16/03* (2013.01); *H02K 5/225* (2013.01); *H01R 2201/26* (2013.01)

(58) Field of Classification Search
CPC ........ H01R 4/34; H01R 2201/26; H01R 9/16; H01R 9/24; H01R 11/09; H01R 4/301; B60R 16/03; H02K 5/225
See application file for complete search history.

(56) References Cited

U.S. PATENT DOCUMENTS 3,850,501 A  11/1974 Butterfield et al.
4,362,351 A * 12/1982 Wible .................... H02K 5/225
                                                     439/926

(Continued)

FOREIGN PATENT DOCUMENTS

DE  102011117433 A1  5/2013
DE  102014201190 A1  7/2015

*Primary Examiner* — Edwin A. Leon
(74) *Attorney, Agent, or Firm* — Laurence. A. Greenberg; Werner H. Stemer; Ralph E. Locher

(57) ABSTRACT

A coupling system establishes an electric connection between two electric components. The first component is positioned in a housing and includes at least one busbar, and the second component is disposed outside the housing and includes at least one current connection. An electrically conductive connection can be established between the busbar and the current connection by the coupling system. The coupling system includes a plug insert which can be plugged into the housing. The plug insert includes an insulator part, in which a sleeve and a washer nut are fixed. The insulator part has a recess which is formed in such a way that the busbar can be moved between the sleeve and the disc nut through the recess. A plug insert for a coupling system is also provided.

14 Claims, 1 Drawing Sheet

(56) References Cited

U.S. PATENT DOCUMENTS

| | | | |
|---|---|---|---|
| 4,614,397 A * | 9/1986 | Flanigan | H01R 9/16 |
| | | | 439/277 |
| 4,690,470 A | 9/1987 | Hayden et al. | |
| 4,734,061 A * | 3/1988 | Randall, Jr. | H04Q 1/142 |
| | | | 439/271 |
| 6,657,336 B2 * | 12/2003 | Morikaku | H02K 11/05 |
| | | | 310/71 |
| 10,211,565 B2 * | 2/2019 | Trimborn | H01R 4/34 |
| 2011/0070761 A1 | 3/2011 | Takehara | |

\* cited by examiner

COUPLING SYSTEM FOR ESTABLISHING AN ELECTRIC CONNECTION

FIELD AND BACKGROUND OF THE INVENTION

The invention relates to a coupling system for establishing an electric connection between two electric components.

Such coupling systems are required, for example, in order to connect an electric machine, which is arranged in a housing, to a power supply. The stator of such an electric machine usually comprises a plurality of coils which are connected to the power supply or the converter of the power supply in a current-conducting manner via individual connections.

A coupling system is known from DE 10 2011 117 433 A1. An electrically conductive connection between the electric motor and the control unit is proposed here, which is provided in the region of a wall opening and has at least one insulating component, which closes the wall opening and serves to hold the electric connection part associated with the electric motor and to hold the electric connection part associated with the control unit.

To ensure electrical contact, an overlap region of the connection parts is provided and the connection parts are fixed to each other by means of a screw connection.

Another coupling system is known from DE 10 2014 201 190 A1. Here, an individually formed connecting socket is provided for each pole of the multi-pole stator-side connection.

Tests have shown, however, that the known coupling systems or current feedthroughs, when used in motor vehicles, cannot withstand the loads in the long term, caused in particular by the large power transmission and the vibrations that occur.

SUMMARY OF THE INVENTION

It is the object of the invention to propose a coupling system for establishing an electric connection, which enables a reliable and cost-effective current feedthrough through a machine housing, and which enables simple and reliable assembly.

The object is achieved in accordance with the invention by an embodiment of a coupling system as described below. Further advantageous features of the embodiment according to the invention can be found in the dependent claims.

A coupling system for establishing an electric connection between two electric components is proposed, wherein the first component is positioned in a housing and comprises at least one busbar, and the second component is arranged outside the housing and comprises at least one current connection, and wherein an electrically conductive connection can be established between the busbar and the current connection by means of the coupling system, comprising a plug insert which can be plugged into the housing.

In accordance with the invention, the plug insert comprises an insulator part, in which a sleeve and a washer nut are fixed, wherein the insulator part has a recess which is arranged such that the busbar can be inserted between the sleeve and the washer nut through the recess. In the sense of the invention, insertion is understood to mean that the busbar can be pushed through the recess of the insulator part into a clamping space between the sleeve and the washer nut during assembly.

Preferably, the insulator part is made of an elastic material and can have sealing lips and a collar. The insulator part must be flexible so that the plug insert can change its position in space so that tolerance fluctuations of the rigid busbar can be compensated.

It is also advantageous if the busbar, the current connection and the sleeve each have a bore through which a screw can be inserted, so that the current connection, the sleeve and the busbar can be fixed to relative to one another between the screw and the washer nut. The contact surfaces for current transmission are particularly large if they are annular.

To ensure that the recess in the insulator part is correctly oriented when the plug insert is plugged in, an anti-rotation means can be provided on the insulator part. This anti-rotation means can be, for example, a stop surface or an extension formed on the collar of the insulating insert, which engages form-lockingly in the housing.

Furthermore, the insulator part can be configured in such a way that the plug insert is allowed to move along the center axis when the screw is tightened. A movement along the center axis of up to 5 mm in the direction of the housing interior can be allowed, wherein the collar is configured to be elastic in such a way that a seal against the housing is ensured in any position.

Furthermore, in addition to the collar, the insulator part can also have a plurality of circumferential sealing lips, by means of which a sealing of the housing interior with respect to the surrounding environment is achieved, wherein the sealing lips allow a tilting of from 0 to 5 degrees with respect to the center axis.

The plug insert according to the invention for the described coupling system comprises an insulator part in which a sleeve and a washer nut are fixed, wherein the insulator part has a recess which is arranged in such a way that the busbar can be moved between the sleeve and the washer nut through the recess. Furthermore, fixing lugs are provided on the insulator part to fix the position of the sleeve and the washer nut in the insulator part.

Further advantageous embodiments of the invention will be explained by means of exemplary embodiments.

DETAILED DESCRIPTION OF THE INVENTION

Figure 1:
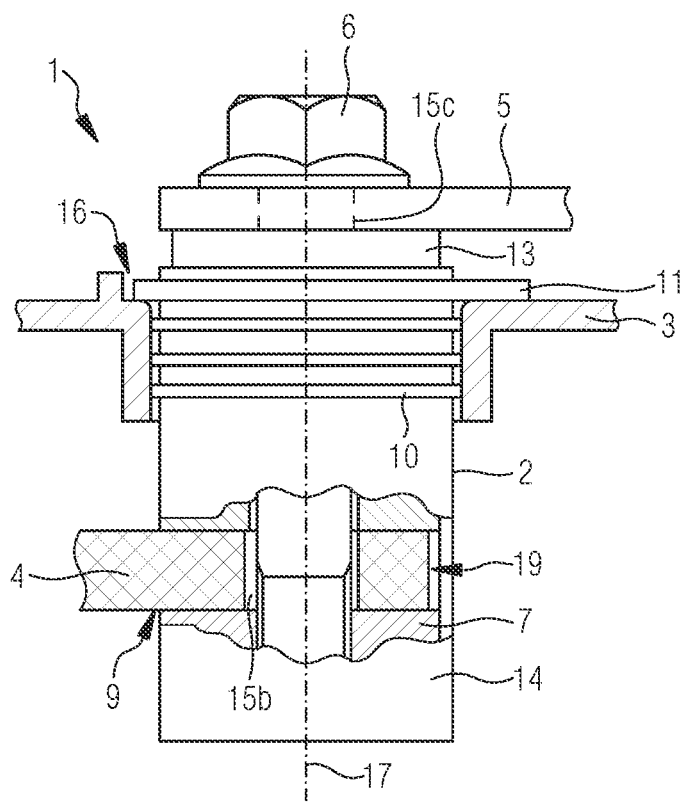
FIG. 1 a coupling system
Figure 2:
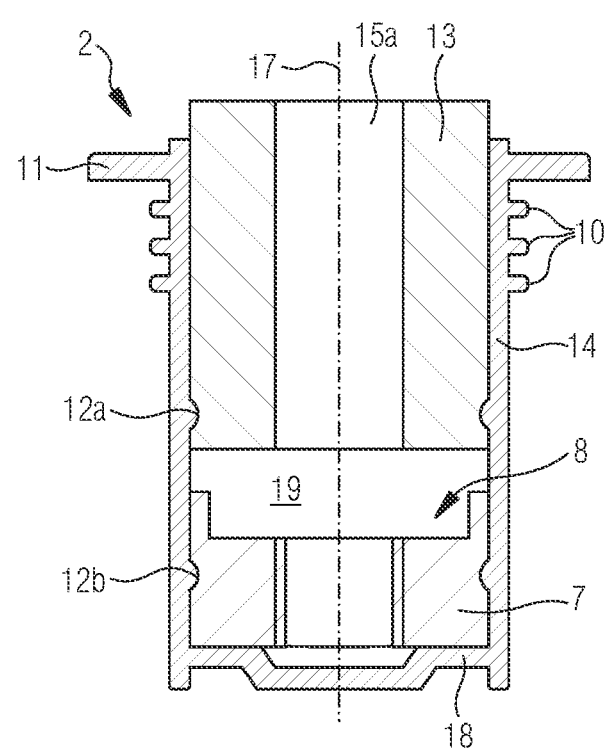
FIG. 2 a plug insert in section

FIG. 1 shows a coupling system 1 according to the invention for establishing an electric connection between two electric components. However, the detail shown here only shows those details of a single coupling system that are essential to the invention. A first component, not shown here, for example an E-machine of a hybrid drive, is positioned within the housing. The power connection of the stator of the E-machine is made via a multi-pole, in particular three-pole connection, wherein each pole is capable of being supplied with electrical power via a busbar 4. The second component, the converter, is arranged outside the housing 3. Coming from the converter, each busbar 4 of the multi-pole connection are each connected to the converter via a flexible current connection 5. The coupling system 1 establishes the electrically conductive connection between a busbar 4 and a current connection 5, by means of the plug insert 2 can be inserted into the housing 3. FIG. 2 shows the plug insert 2 in section so that the individual components are visible. The shell is formed by the insulator part 14, which is made of an electrically insulating, flexible and preferably flame-retardant material. The insulator part 14 has a collar 11, by means of which a first seal is achieved with respect to the housing 3. In order to ensure an axial movability of the plug insert 2 along the central axis 17, this can also be embodied as a conical sealing lip. The washer nut 7 and the sleeve 13, which is made of a material that conducts electricity very well, are positioned in the insulator part 14. Both components 7, 13 are pushed into the insulator part 14 until the corresponding fixing lugs 12*a, b* engage in the components. The washer nut 7 incorporates the groove 8, by means of which the nut is secured against rotation when the busbar 4 engages. The bottom 18 of the insulator part prevents the washer nut 7 from falling out into the interior of the housing. In the region of the groove 8, there is a recess 9, not shown here, in the insulator part 14, through which the busbar 4 can be inserted into the plug insert.

As explained above, to ensure that the recess 8 in the insulator part 14 is correctly oriented when the plug insert 2 is plugged in, an anti-rotation means 16 can be provided on the insulator part 14. This anti-rotation means 16 can be, for example, a stop surface or an extension formed on the collar 11 of the insulating insert 14, which engages form-lockingly in the housing 3.

To produce the coupling system 1, the preassembled plug insert 2 is inserted into an opening provided for this purpose in the housing 3. To seal the opening, three circumferential sealing lips 10 are provided in addition to the collar 11, which are flexible enough to allow tolerance compensation in all three axes.

A plug insert 2 is provided for each busbar 4 of the electric machine. Due to the manufacturing tolerances, the busbars 4 in particular exhibit a high tolerance variation, or the position of the busbars 4 in space is subject to relatively large fluctuations. The plug insert 2 must be able to compensate for these fluctuations without exerting constraining forces on the busbar 4.

The design of the plug insert 2 allows blind mounting of the electric machine or the stator. Despite the positional fluctuations of the busbars 4 in space, this can be realized because the distance between the washer nut 7 and sleeve 13 has been selected to be correspondingly large. After the flexible current connection 5 has been fitted, the screw 6 is inserted through the bores 15 a, b, c of the current connection 5, the sleeve 13, and the busbars 4 and is screwed into the washer nut 7 so that the components are clamped together. During clamping, the clamping space 19 is reduced, wherein the flexibility of the insulator part 14 compensates for the reduction in the distance between the sleeve 13 and the washer nut 7 by the fact that the insulator part 14 deforms in the region of the clamping space. The contact surfaces on the sleeve 13, busbar 4 and washer nut 7 can fit together in an ideal manner, so that reliable current transmission is ensured.

The flexibility of the insulator part 14 further enables the plug insert 2 as a whole to always be oriented starting from the clamped busbar 4, so that a force-free, process-reliable and functionally reliable connection is produced. In other words, this means that the plug insert 2 is oriented in space with respect to the housing 3 due to the flexibility of the insulating sleeve 14, wherein the direction of orientation is specified by the busbar 4.

LIST OF REFERENCE SIGNS 1 coupling system
2 plug insert
3 housing
4 busbar
5 current connection
6 screw
7 washer nut
8 groove
9 recess
10 sealing lips
11 collar
12 a,b fixing lug
13 sleeve
14 insulator part
15 a,b,c bore
16 anti-rotation means
17 center axis
18 bottom of the insulator part
19 clamping space

The invention claimed is:

1. A coupling system for establishing an electric connection between two electric components, the coupling system comprising:
   a housing configured to receive a first component including at least one busbar in said housing, and said housing configured to have a second component including at least one current connection disposed outside said housing; and
   a plug insert configured to be plugged into said housing for establishing an electrically conductive connection by the coupling system between the busbar and the current connection;
   said plug insert including an insulator part, and said plug insert including a sleeve and a washer nut fixed in said insulator part;
   said insulator part having a recess permitting the busbar to be inserted between said sleeve and said washer nut through said recess.

2. The coupling system according to claim 1, wherein said insulator part is formed of an elastic material and has sealing lips and a collar.

3. The coupling system according to claim 2, which further comprises a screw configured to be inserted through bores respectively formed in the busbar, the current connection and said sleeve, for fixing the current connection, said sleeve and the busbar relative to one another between said screw and said washer nut.

4. The coupling system according to claim 1, wherein said insulator part has an anti-rotation device.

5. The coupling system according to claim 4, wherein said anti-rotation device is an extension formed on said insulator part.

6. The coupling system according to claim 3, wherein said insulator part is configured to allow said plug insert to move along a center axis upon tightening said screw.

7. The coupling system according to claim 6, wherein said insulator part is configured to allow said plug insert to move along said center axis by a distance of up to 5 mm in a direction of an interior of said housing, and said collar is configured to be elastic to ensure a seal against said housing in any position.

8. The coupling system according to claim 1, wherein said insulator part has a plurality of circumferential sealing lips for sealing an interior of said housing relative to a surrounding environment, said sealing lips allowing a tilting of from 0 to 5 degrees relative to a center axis.

9. A plug insert for the coupling system according to claim 1, the plug insert comprising:
   said insulator part; and said sleeve and said washer nut being fixed in said insulator part;

said insulator part having said recess permitting the busbar to be inserted between said sleeve and said washer nut through said recess.

10. The plug insert according to claim 9, wherein said insulator part has fixing lugs for fixing a position of said sleeve and said washer nut in said insulator part.

11. A method of using a coupling system, the method comprising:

providing the coupling system according to claim 1; and using the coupling system in a vehicle including a hybrid drive for contacting a power connection of an electric machine of the hybrid drive.

12. A method of using a plug insert, the method comprising:

providing the plug insert according to claim 9; and using the plug insert in a vehicle including a hybrid drive for contacting a power connection of an electric machine of the hybrid drive.

13. A vehicle, comprising a hybrid drive with the coupling system according to claim 1 for contacting a power connection of an electric machine of the hybrid drive.

14. A vehicle, comprising a hybrid drive with the plug insert according to claim 9 for contacting a power connection of an electric machine of the hybrid drive.

* * * * *